(12) United States Patent
Watanabe

(10) Patent No.: US 9,879,707 B2
(45) Date of Patent: Jan. 30, 2018

(54) COMPONENT-PART DRIVING MECHANISM

(71) Applicant: NIFCO INC., Kanagawa-ken (JP)

(72) Inventor: Yasuhiro Watanabe, Yokosuka (JP)

(73) Assignee: NIFCO INC., Kanagawa-Ken (JP)

( * ) Notice: Subject to any disclaimer, the term of this patent is extended or adjusted under 35 U.S.C. 154(b) by 0 days.

(21) Appl. No.: 15/104,578

(22) PCT Filed: Dec. 15, 2014

(86) PCT No.: PCT/JP2014/083136
§ 371 (c)(1),
(2) Date: Jun. 15, 2016

(87) PCT Pub. No.: WO2015/093437
PCT Pub. Date: Jun. 25, 2015

(65) Prior Publication Data
US 2016/0319855 A1    Nov. 3, 2016

(30) Foreign Application Priority Data

Dec. 18, 2013 (JP) ................................. 2013-261137

(51) Int. Cl.
*F16B 21/00* (2006.01)
*F16B 5/02* (2006.01)
(Continued)

(52) U.S. Cl.
CPC .......... *F16B 5/0241* (2013.01); *F16B 5/0258* (2013.01); *F16B 21/00* (2013.01); *F16B 21/073* (2013.01); *F16B 39/02* (2013.01)

(58) Field of Classification Search
CPC .... F16B 5/0225; F16B 5/0241; F16B 5/0258; F16B 21/00; F16B 21/073; F16B 21/084; F16B 37/0842; F16B 39/02
(Continued)

(56) References Cited

U.S. PATENT DOCUMENTS 2,727,407 A    12/1955  Richards
3,916,756 A *  11/1975  Yoda ..................... F16B 21/073
                                                          24/682.1
(Continued)

FOREIGN PATENT DOCUMENTS

JP    2002-122118 A    4/2002
JP    2005-331067 A    12/2005
(Continued)

OTHER PUBLICATIONS

Office Action dated Feb. 20, 2017 from Japanese Application No. 201480068040.8 (7 pages).
(Continued)

*Primary Examiner* — Roberta S Delisle
(74) *Attorney, Agent, or Firm* — James R. Gourley; Carstens & Cahoon, LLP

(57) ABSTRACT

This component-part driving mechanism changes the relative position of a second member with respect to a first member and is provided with: a contact section that is provided to the first member; a biasing section that is an elastic lip that is provided to the second member and that accumulates biasing force as a result of changes in the distance between the contact section and the elastic lip, said biasing force serving to change the relative position in a predetermined direction; and a state maintenance section that maintains a state in which the elastic lip is in contact with the contact section. The relative position of the contact section and the elastic lip is made to change in the predetermined direction as a result of repeated accumulation and release of biasing force that is caused by vibration of the elastic lip relative to the contact section.

11 Claims, 8 Drawing Sheets

(51) Int. Cl.
*F16B 39/02* (2006.01)
*F16B 21/07* (2006.01)

(58) Field of Classification Search
USPC .............................. 411/45–48, 508–509, 512
See application file for complete search history.

(56) References Cited

U.S. PATENT DOCUMENTS

| | | | | |
|---|---|---|---|---|
| 4,318,208 A | * | 3/1982 | Borja | E05C 19/066 24/305 |
| 5,562,375 A | * | 10/1996 | Jackson | F16B 19/1081 411/48 |
| 5,580,204 A | * | 12/1996 | Hultman | F16B 5/065 24/297 |
| 5,647,713 A | * | 7/1997 | Ge | B29C 45/1676 24/324 |
| 5,868,537 A | * | 2/1999 | Latal | F16B 21/084 411/418 |
| 6,077,011 A | * | 6/2000 | Walker | F16B 21/165 24/453 |
| 6,132,154 A | * | 10/2000 | Easter | B62D 29/048 24/297 |
| 6,431,585 B1 | * | 8/2002 | Rickabus | B60R 21/215 24/114.05 |
| 7,017,239 B2 | * | 3/2006 | Kurily | B60R 13/0206 24/297 |
| 7,082,919 B2 | * | 8/2006 | Nonogaki | F02F 7/006 123/198 E |
| 7,168,879 B2 | * | 1/2007 | Bertram | F16B 21/073 403/132 |
| 2004/0022600 A1 | | 2/2004 | Kovac | |

FOREIGN PATENT DOCUMENTS

| | | |
|---|---|---|
| JP | 2006-82969 A | 3/2006 |
| JP | 2006-507465 A | 3/2006 |
| JP | 2008-128359 A | 6/2008 |
| JP | 2008-129350 A | 6/2008 |
| JP | 2012-57778 A | 3/2012 |

OTHER PUBLICATIONS

Extended European Search Report dated Jun. 13, 2017 for EP Patent Application No. 148726534.4 (6 pages).

* cited by examiner

COMPONENT-PART DRIVING MECHANISM

TECHNICAL FIELD

The present disclosure is related to a component-part driving mechanism that drives a component part.

BACKGROUND ART

A known configuration of a supporting structure that supports a cylinder head cover with a cylinder head makes use of joining between a fastening member attached to the cylinder head and a damping member attached to the cylinder head cover. The fastening member may be, for example, a male screw member that engages, via a screw thread, with a female screw section formed in the cylinder head, whereas the damping member may be, for example, an elastic ring fitted into a fitting groove formed in the cylinder head cover. Further, as a result of the head of the male screw member being fitted into a fitting hole formed in the elastic ring, the cylinder head and the cylinder head cover are indirectly joined with each other (see Patent Document 1, for example).

Among fastening members that can be attached to a cylinder head, attention is paid to a fastener that is made of resin and has locking pieces obtained by cutting out some portions of a male screw section of a male screw member along the axial direction, for the purpose of reducing the labor required by the fastening process. Unlike the male screw section, the locking pieces formed on the fastener made of resin are able to warp along the axial direction. Accordingly, the operation of fastening the resin fastener is sufficiently accomplished by inserting the resin fastener into a hole having a female screw section, instead of rotating the resin fastener (see Patent Document 2, for example).

PRIOR ART DOCUMENT

Patent Document

Patent Document 1
Japanese Laid-open Patent Publication No. 2005-331067
Patent Document 2
Japanese Laid-open Patent Publication No. 2012-57778

SUMMARY OF INVENTION

Problems that are to be Solved by the Invention

Part of the vibration occurring in the cylinder head is usually transmitted, to no small extent, also to the cylinder head cover via the damping member. In that situation, because the vibration of the cylinder head cover and the vibration of the cylinder head are different from each other in the directions of the vibrations and the cycles of the vibrations, the difference between the vibrations acts in such a direction that loosens the fastening between the cylinder head and the fastening member.

The problem where the position of a component part unexpectedly changes in an undesirable direction not only can be observed in a structure where the position of a fastening member used for a fastening purpose changes in such a direction that releases the fastening, but also is common to all structures including a component part that receives vibration, such as a structure in which, for example, the position of a temporary fastening member, which is used on the premise that the fastening is to be released, changes in such a direction that promotes the fastening.

An object of the present disclosure is to provide a component-part driving mechanism that prevents the situation where the position of a component part changes in an undesirable direction.

Means for Solving the Problem

In one aspect of a component-part driving mechanism of the present disclosure, the component-part driving mechanism that changes a relative position of a second component part relative to a position of a first component part includes: an abutting section provided for the first component part; an urging section provided for the second component part and accumulates an urging force as a result of changes in a distance between the abutting section and the urging section, said urging force serving to change the relative position in a predetermined direction; and a state maintaining section that maintains a state in which the urging section is abutting against the abutting section. Further, the abutting section and the urging section displace the relative position in the predetermined direction as a result of a repetition of accumulating and releasing of the urging force due to vibration of the urging section relative to the abutting section.

According to the one aspect of the component-part driving mechanism of the present disclosure described above, when the second component part vibrates relative to the first component part, the urging section vibrates relative to the abutting section so that the accumulation of the urging force in the urging section and the release of the urging force in the urging section are repeated. Further, the position of the second component part relative to that of the first component part changes in the predetermined direction every time the urging force is released. As a result, it is possible to inhibit the position of the second component part relative to that of the first component part from changing in an undesirable direction.

In another aspect of the component-part driving mechanism of the present disclosure, it is desirable that the abutting section is configured to receive the urging force in a direction in which the urging force acts.

According to the one aspect of the component-part driving mechanism of the present disclosure described above, because the urging force exerted by the urging section is received by the abutting section, the displacement of the position of the second component part relative to that of the first component part is developed smoothly when the urging force is released.

In yet another aspect of the component-part driving mechanism of the present disclosure, one of the first and the second component parts is a fastening member that rotates and fastens onto a coupling target, while the other of the first and the second component parts that is not the fastening member is a coupled member that is fastened onto the coupling target via the fastening member. Further, it is desirable that one of the coupling target and the coupled member includes a screw-thread engaged section that is either a female screw section or a male screw section and that the fastening member includes a screw-thread engaging section that engages with the screw-thread engaged section.

According to the one aspect of the component-part driving mechanism of the present disclosure described above, the urging force exerted by the urging section is able to inhibit the thread-screw engagement between the one of the coupling target and the coupled member and the fastening member from becoming loose.

In yet another aspect of the component-part driving mechanism of the present disclosure, it is desirable that the urging section is provided for one of the fastening member and the coupled member and that the state maintaining section is provided for another one of the fastening and the coupled members that is not provided with the urging section.

According to the one aspect of the component-part driving mechanism of the present disclosure described above, because the urging section and the state maintaining section are provided for the mutually-different members, the member provided with the urging section is able to have a structure that specializes in the accumulation and the release of the urging force which the urging section is required to realize. Further, the member provided with the engagement section is able to have a structure that specializes in maintaining the abutment state between the urging section and the abutting section.

In yet another aspect of the component-part driving mechanism of the present disclosure, it is desirable that the fastening member has a shaft-like shape and that the coupled member is in a shape of a cylinder positioned on an outer circumference of the fastening member.

According to the one aspect of the component-part driving mechanism of the present disclosure described above, it is possible to inhibit the position of the coupled member relative to that of the fastening member from changing in an undesirable direction by using the simple shapes of the fastening member that has the shaft-like shape and the coupled member that is in the shape of the cylinder positioned on the outer circumference of the fastening member.

In yet another aspect of the component-part driving member of the present disclosure, it is desirable that the fastening member has an outer circumference enlarged section that is positioned adjacent to the abutting section.

According to the one aspect of the component-part driving mechanism of the present disclosure described above, because the outer circumference enlarged section that is positioned adjacent to the abutting section is able to prevent the urging section from coming out of contact with the abutting section, the abutment state between the urging section and the abutting section is easily maintained.

In yet another aspect of the component-part driving mechanism of the present disclosure, it is desirable that the component-part driving mechanism includes a plurality of the urging sections and that the plurality of urging sections are arranged in a row along a direction in which the fastening member rotates.

According to the one aspect of the component-part driving mechanism of the present disclosure described above, because the urging force applied from the second component part to the first component part is enhanced, it is possible to better inhibit the position of the second component part relative to that of the first component part from changing in an undesirable direction.

In yet another aspect of the component-part driving mechanism of the present disclosure, it is desirable that the screw-thread engaging section has an elastic force that enables the screw-thread engaging section to go over a screw section of the screw-thread engaged section.

According to the one aspect of the component-part driving mechanism of the present disclosure described above, because the thread-screw engaged section and the thread-screw engaging section engage with each other via the screw thread, as a result of the screw-thread engaging section being inserted into the screw-thread engaged section. Consequently, it is possible to save the labor required by achieving the screw-thread engagement, compared to the situation where the screw-thread engagement therebetween is achieved by rotating the screw-thread engaging section.

EMBODIMENTS OF THE INVENTION

An embodiment in which a component-part driving mechanism of the present disclosure is embodied as a fastening-member driving mechanism will be explained, with reference to FIGS. 1 to 8. First, an overall configuration of the fastening-member driving mechanism will be explained with reference to FIG. 1, together with a cylinder head and a cylinder head cover to which the fastening-member driving mechanism is applied.

<Configuration of Fastening-Member Driving Mechanism>

Figure 1:
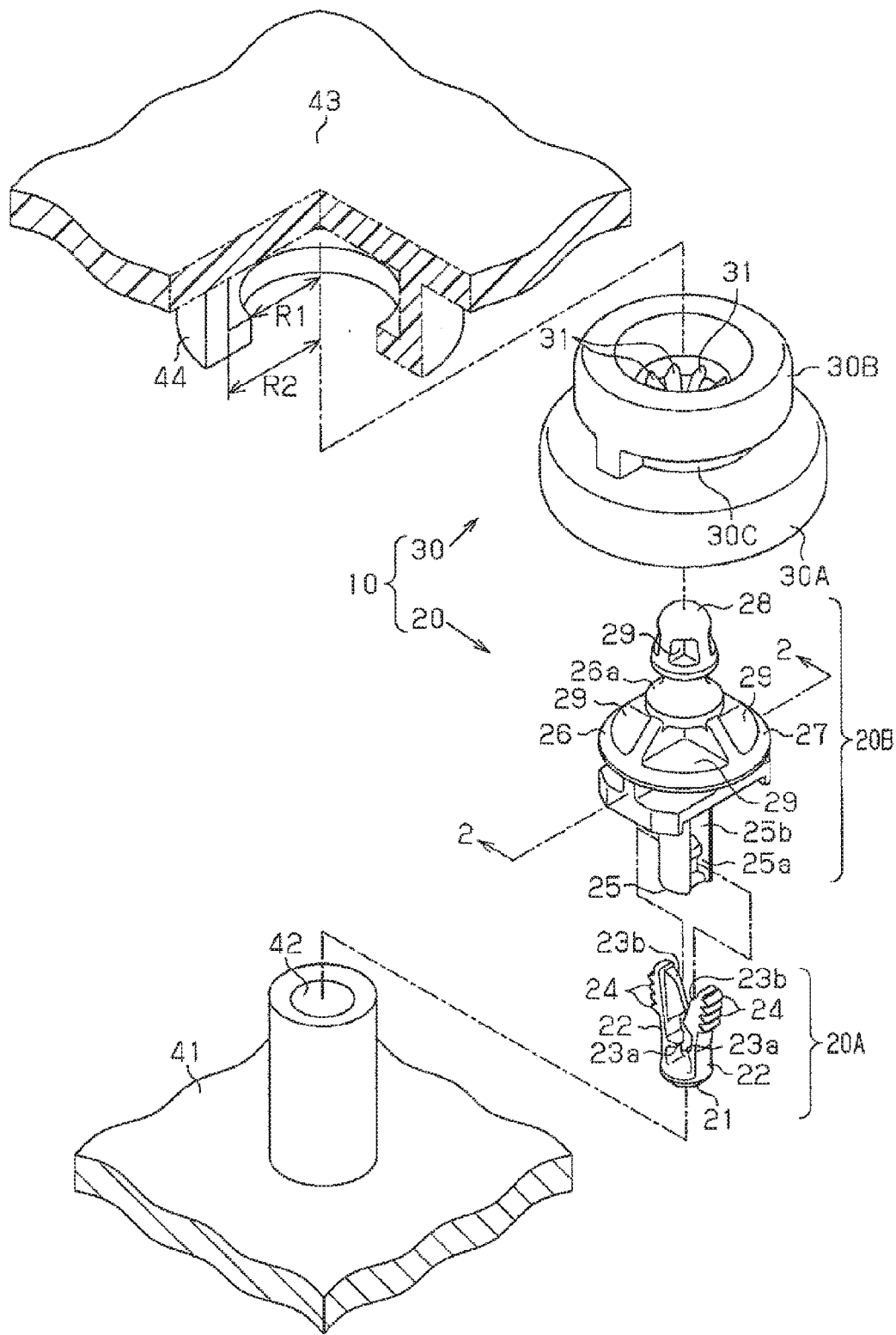
FIG. 1 is an exploded perspective view illustrating an exploded perspective structure of a fastening-member driving mechanism according to an embodiment together with a part of a cylinder head and a part of a cylinder head cover, wherein a component-part driving mechanism of the present disclosure is embodied as the fastening-member driving mechanism.

As illustrated in FIG. 1, a fastening-member driving mechanism 10 includes a fastening screw 20 that serves as an example of the first component part and also serves as an example of the fastening member; and a damping member 30 made of resin that serves as an example of the second component part and also serves as an example of the coupled member. The fastening screw 20 includes: a fitting screw section 20A that is made of resin and that serves as an example of the screw-thread engaging section; and a fitted pin 20B that is made of resin.

The fitting screw section 20A includes: an insertion bottom section 21 having a disc shape; and two fitting leg sections 22 extending in the shape of a V from the circumferential edge of the insertion bottom section 21 toward the above of the insertion bottom section 21. The two fitting leg sections 22 are integrally formed with the insertion bottom section 21.

A cylinder head 41 serving as an example of the coupling target has formed therein an attachment hole 42 into which the fastening screw 20 can be attached. The attachment hole 42 has formed therewith a female screw section serving as an example of the screw-thread engaged section. The insertion bottom section 21 is sized so as to be able to go into the attachment hole 42. The two fitting leg sections 22 are connected to the circumferential edge of the insertion bottom section 21 in such positions that oppose each other.

Of the faces of each of the two fitting leg sections 22, the face opposing the other fitting leg section 22 will be referred to as an inner face of the fitting leg section 22. Of the faces of each of the fitting leg sections 22, the face positioned on the opposite side from the inner face will be referred to as an outer face of the fitting leg section 22. In each of the two fitting leg sections 22, the section connected to the insertion bottom section 21 will be referred to as a basal-end section of the fitting leg section 22. Of the two ends of each of the fitting leg sections 22, the end positioned on the opposite side from the basal-end section will be referred to as a distal-end section of the fitting leg section 22.

From the inner face of each of the two fitting leg sections 22, one basal-end-side fitting projection 23a and one distal-end-side fitting projection 23b protrude toward the other fitting leg section 22. In each of the fitting leg sections 22, the basal-end-side fitting projection 23a and the distal-end-side fitting projection 23b are arranged along the extending direction of the fitting leg section 22 while having a space therebetween.

From the outer face of each of the two fitting leg sections 22, a plurality of locking pieces 24 protrude outward in the radial direction of the insertion bottom section 21. In each of the two fitting leg sections 22, the plurality of locking pieces 24 are arranged in a row along the extending direction of the fitting leg section 22 while being positioned at regular intervals. The space formed between any two of the locking pieces 24 that are positioned adjacent to each other in one of the fitting leg sections 22 is arranged to oppose a corresponding one of the locking pieces 24 in the other fitting leg section 22. The plurality of locking pieces 24 provided in the two fitting leg sections 22 function as a male screw section that is capable of engaging, in the manner of a screw thread, with the female screw section formed in the attachment hole 42.

The fitted pin 20B includes a shaft section 25 extending along the central axis of the insertion bottom section 21 and an abutting section 26 that is cone-shaped and extends upward from the shaft section 25. The shaft section 25 and the abutting section 26 are integrally formed.

The shaft section 25 is in the shape of a circular pillar of which the outside diameter is substantially equal to that of the insertion bottom section 21. The shaft section 25 is sized so as to be able to go into the attachment hole 42 formed in the cylinder head 41. On the outer circumferential surface of the shaft section 25, two basal-end-side fitting holes 25a and one distal-end-side fitting hole 25b are formed in the manner of recesses receding toward the inner side in the radial direction of the shaft section 25. The two basal-end-side fitting holes 25a oppose each other in the radial direction of the shaft section 25. The one distal-end-side fitting hole 25b penetrates through the shaft section 25 along the radial direction of the shaft section 25. The position of the fitting screw section 20A relative to that of the fitted pin 20B is determined when each of the two basal-end-side fitting holes 25a has a corresponding one of the two basal-end-side fitting projections 23a fitted therein, and at the same time, the two distal-end-side fitting projections 23b are fitted into the one distal-end-side fitting hole 25b.

As long as it is possible to determine the position of the fitting screw section 20A relative to that of the fitted pin 20B, it is acceptable to omit, for example, the basal-end-side fitting projections 23a and the basal-end-side fitting holes 25a. Alternatively, the distal-end-side fitting projections 23b and the distal-end-side fitting hole 25b may be omitted. Further, the quantity of the fitting leg sections 22 of the fitting screw section 20A, the quantity of the basal-end-side fitting holes 25a of the shaft section 25, and the quantity of the distal-end-side fitting hole 25b of the shaft section 25 may be modified as necessary, on the premise that it is possible to determine the position of the fitting screw section 20A relative to that of the fitted pin 20B. Further, as long as the fastening screw 20 has a screw section capable of engaging, via a screw thread, with the screw section formed in the attachment hole 42 and the abutting section 26, the fastening screw 20 may be configured so that the fitting screw section 20A and the fitted pin 20B are integrally formed.

The outer circumferential surface of the abutting section 26 has an abutting surface 26a that is curved in the manner of a recess receding toward the inner side in the radial direction of the abutting section 26. The abutting surface 26a is a circular-arc surface that structures a continuous recess along the circumferential direction of the abutting section 26 and is formed along the entire circumference of the abutting section 26. The abutting surface 26a is positioned substantially at the center of the abutting section 26 in the axial direction of the abutting section 26. Along the axial direction of the abutting section 26, the abutting surface 26a divides the one abutting section 26 into a basal-end-side abutting section 27 serving as an example of the outer circumference enlarged section and a distal-end-side abutting section 28.

The outer circumferential surface of the abutting section 26 has a plurality of hollowed sections 29 that are arranged along the circumferential direction of the abutting section 26. However, it is possible to select, as appropriate, whether the hollowed sections 29 should be provided or not, depending on the amount of resin required by the shaping of the abutting section 26 and the level of rigidity required of the abutting section 26.

The damping member 30 is in the shape of three-tiered circular cylinders and includes: a large diameter cylinder section 30A positioned closest to the fitting screw section 20A; a medium diameter cylinder section 30B positioned most distant from the fitting screw section 20A; and a small diameter cylinder section 30C positioned between the large diameter cylinder section 30A and the medium diameter cylinder section 30B.

A cylinder head cover 43 has a fitting section 44 that is in the shape of a circular cylinder of which the opening is reduced in diameter. The opening of the fitting section 44 is a circular hole having an opening radius R1. The interior of the fitting section 44 has an inside radius R2 that is larger than the opening radius R1. The outside diameter of the large diameter cylinder section 30A is sufficiently larger than double the inside radius R2. The outside diameter of the medium diameter cylinder section 30B is larger than double the opening radius R1 and is substantially equal to double the inside radius R2. The outside diameter of the small diameter cylinder section 30C is substantially equal to double the opening radius R1. The damping member 30 is fixed to the cylinder head cover 43, when the medium diameter cylinder section 30B is fitted to the inside of the fitting section 44 while, at the same time, the small diameter cylinder section 30C is fitted into the opening section of the fitting section 44. On the inner circumferential surface of the small diameter cylinder section 30C, a plurality of elastic lips 31 structuring an urging section protrude toward the inside of the small diameter cylinder section 30C.

A mode of assembling the fastening screw 20 and the damping member 30 together will be explained, with reference to FIG. 2.

Figure 2:
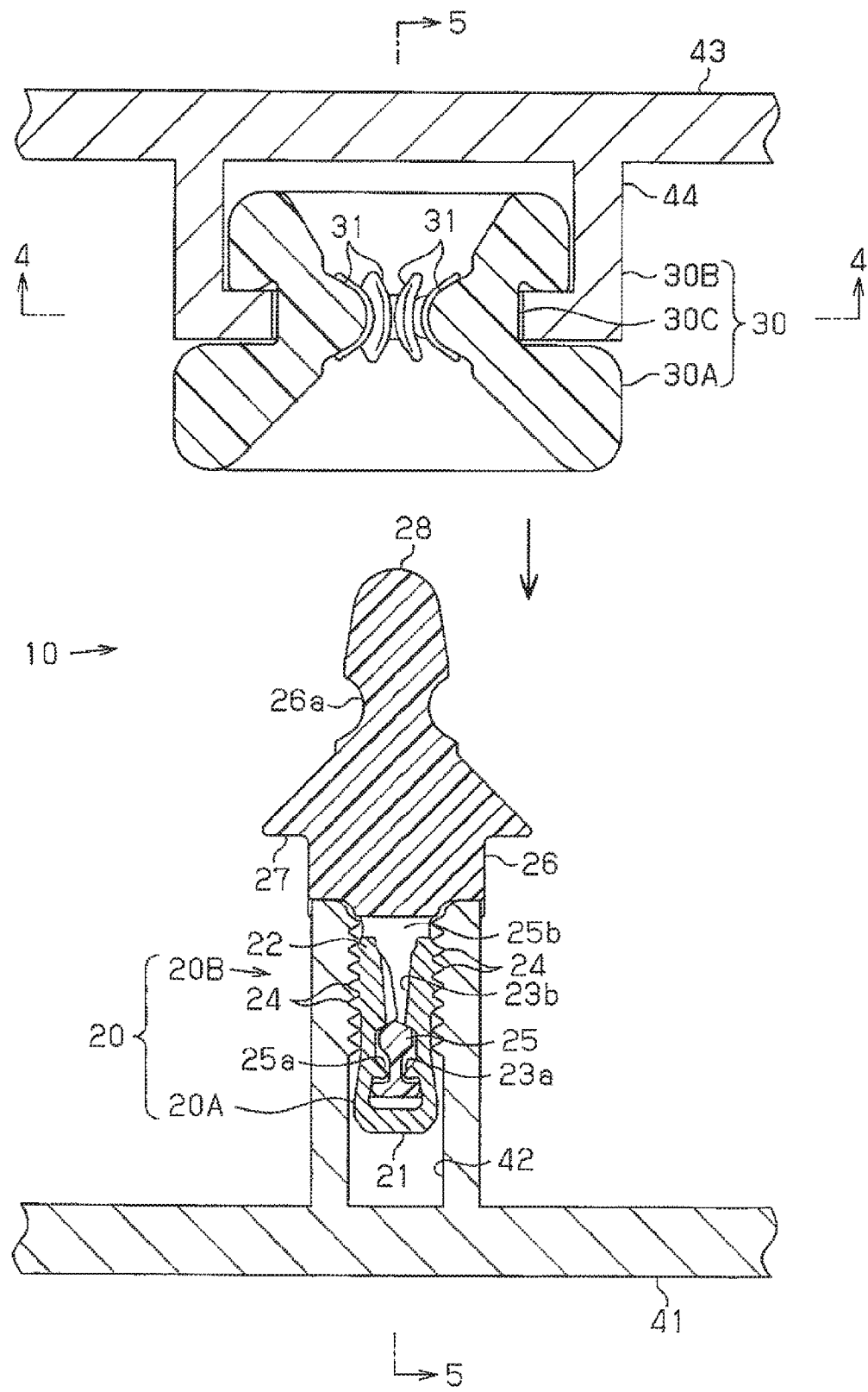
FIG. 2 is a cross-sectional view illustrating a cross-sectional structure of the fastening-member driving mechanism according to the embodiment, together with a part of a cross-sectional structure of the cylinder head and a part of a cross-sectional structure of the cylinder head cover.

As illustrated in FIG. 2, the fastening screw 20 is inserted into the attachment hole 42, while the basal-end-side fitting projections 23a are fitted into the basal-end-side fitting holes 25a, and also, the distal-end-side fitting projections 23b are fitted into the distal-end-side fitting hole 25b. In that situation, the plurality of locking pieces 24 formed on the fitting leg sections 22 are able to warp along the axial direction of the attachment hole 42. Further, the plurality of locking pieces 24 are formed only on the two fitting leg sections 22 in the inner circumferential direction of the attachment hole 42. In other words, the locking pieces 24 are positioned only in parts along the inner circumferential direction of the attachment hole 42. Accordingly, the attachment of the fastening screw 20 to the female screw section of the attachment hole 42 is smoothly accomplished by inserting the fastening screw 20, without the need to rotate the fastening screw 20.

The medium diameter cylinder section 30B of the damping member 30 is fitted to the inside of the fitting section 44, and also, the small diameter cylinder section 30C of the damping member 30 is fitted to the opening section of the fitting section 44. Further, as indicated with the arrow in FIG. 2, starting with the state in which the large diameter cylinder section 30A and the distal-end-side abutting section 28 oppose each other, the cylinder head cover 43 is pressed against the cylinder head 41. As a result, the inner circumferential surface of the large diameter cylinder section 30A abuts against the outer circumferential surface of the abutting section 26, so that the abutting surface 26a is fitted to the inside of the small diameter cylinder section 30C. Further, the fastening screw 20 and the damping member 30 are assembled with each other, so that the cylinder head 41 and the cylinder head cover 43 are indirectly coupled with each other, via the fastening screw 20 and the damping member 30.

Detailed structures of the fastening screw 20 and the damping member 30 will be explained, with reference to FIGS. 3 to 6.

Figure 3:
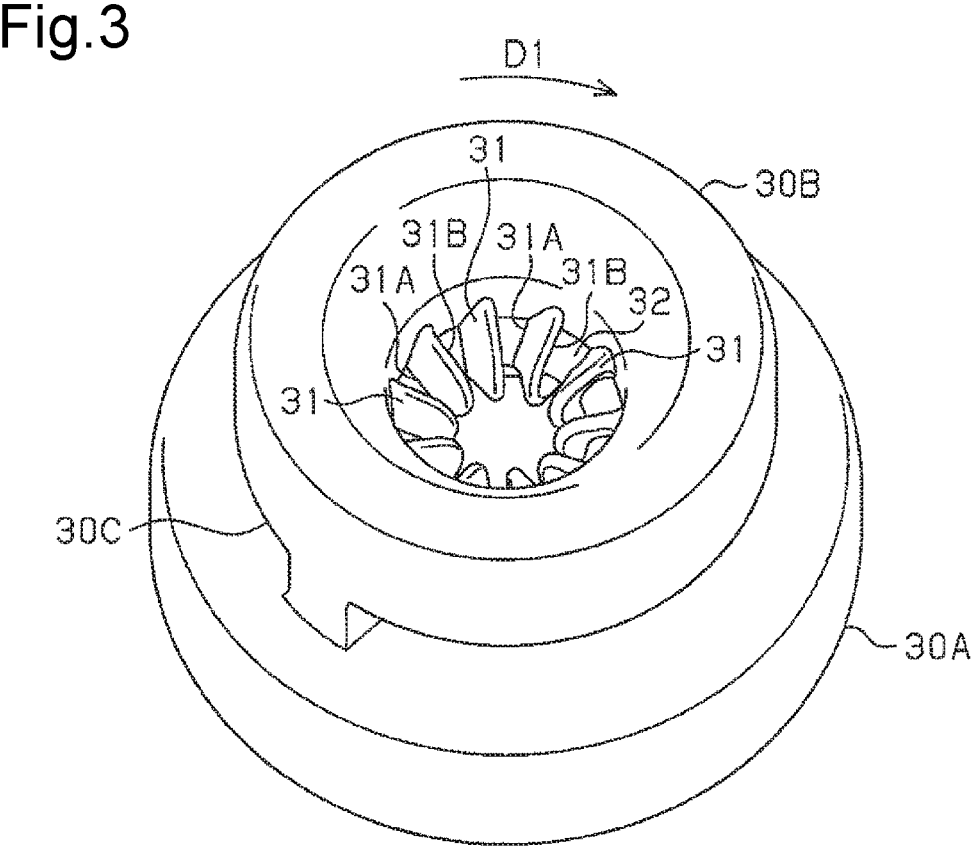
FIG. 3 is a perspective view of a perspective structure of a damping member included in the fastening-member driving mechanism according to the embodiment.

As illustrated in FIG. 3, one lip supporting section 32 protrudes toward the inside of the small diameter cylinder section 30C on the inner circumferential surface of the small diameter cylinder section 30C of the damping member 30. The lip supporting section 32 has an annular shape extending entirely along the circumferential direction of the small diameter cylinder section 30C and also has a semi-circular shape as viewed on a cross-sectional plane that includes the central axis of the small diameter cylinder section 30C. The lip supporting section 32 forms, on the inner circumferential surface of the small diameter cylinder section 30C, a semi-circular arc surface extending entirely along the circumferential direction of the small diameter cylinder section 30C. On the semi-circular arc surface of the lip supporting section 32 and the inner circumferential surface of the small diameter cylinder section 30C, the plurality of elastic lips 31 that are integrally formed therewith are arranged in a row along the circumferential direction of the small diameter cylinder section 30C.

The circumferential direction of the small diameter cylinder section 30C can go in two directions. One of the two circumferential directions will be referred to as a forward direction D1 and is the direction in which the fastening screw 20 is fastened onto the cylinder head 41. Each of the plurality of elastic lips 31 is in the shape of a bowl opening toward the forward direction D1. Each of the plurality of elastic lips 31 is in the shape of the cylindrical surface of a conical frustum that is substantially concentric with the central axis of the annular-shaped lip supporting section 32. The upper side section of the cylindrical surface of the conical frustum will be referred to as a lip basal-end section 31A, whereas the bottom side section of the cylindrical surface of the conical frustum will be referred to as a lip distal-end section 31B. Each of the plurality of elastic lips 31 is connected to the lip supporting section 32 by the entirety of the lip basal-end section 31A and is positioned apart from the lip supporting section 32 at the lip distal-end section 31B. Each of the plurality of elastic lips 31 tolerates an elastic deformation that changes the distance between the lip distal-end section 31B and the lip supporting section 32.

Figure 4:
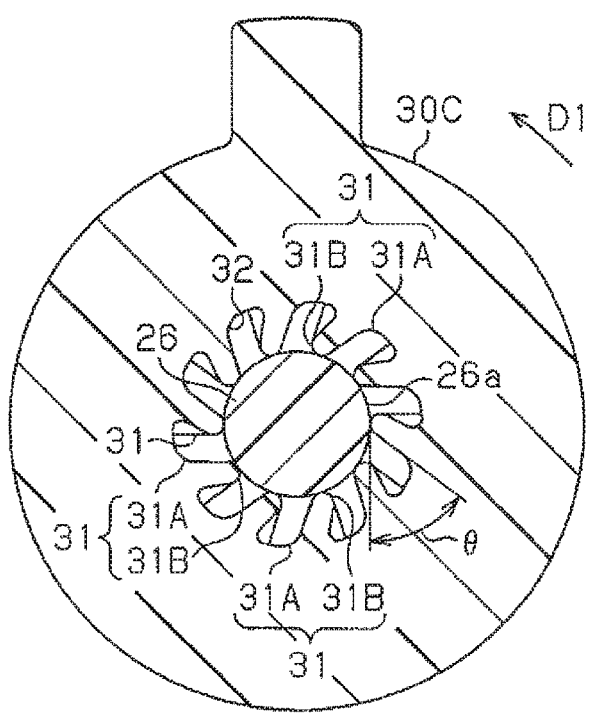
FIG. 4 is a cross-sectional view illustrating a cross-sectional structure of the damping member included in the fastening-member driving mechanism according to the embodiment, the cross-sectional structure being taken along line 4-4 in FIG. 2.

As illustrated in FIG. 4, the plurality of elastic lips 31 are arranged at regular intervals along the inner circumferential surface of the small diameter cylinder section 30C. In each of all the elastic lips 31, the lip distal-end section 31B is positioned in the forward direction D1 from the lip basal-end section 31A. In each of all the elastic lips 31, the lip distal-end section 31B is in contact with the abutting surface 26a of the abutting section 26. The cylinder section of the small diameter cylinder section 30C functions as a state maintaining section that maintains the state where the lip distal-end sections 31B and the abutting surface 26a abut against each other, by pressing the lip distal-end section 31B against the abutting surface 26a while using an elastic force exerted by the cylinder section.

The angle θ formed by the direction in which each of the lip distal-end sections 31B protrudes from the lip basal-end section 31A and the direction of the tangent line of the abutting surface 26a is an acute angle. The elastic force of the elastic lips 31 acting from the lip basal-end sections 31A toward the lip distal-end sections 31B is received by the abutting surface 26a, as an urging force that urges the abutting surface 26a along the forward direction D1.

Figure 5:
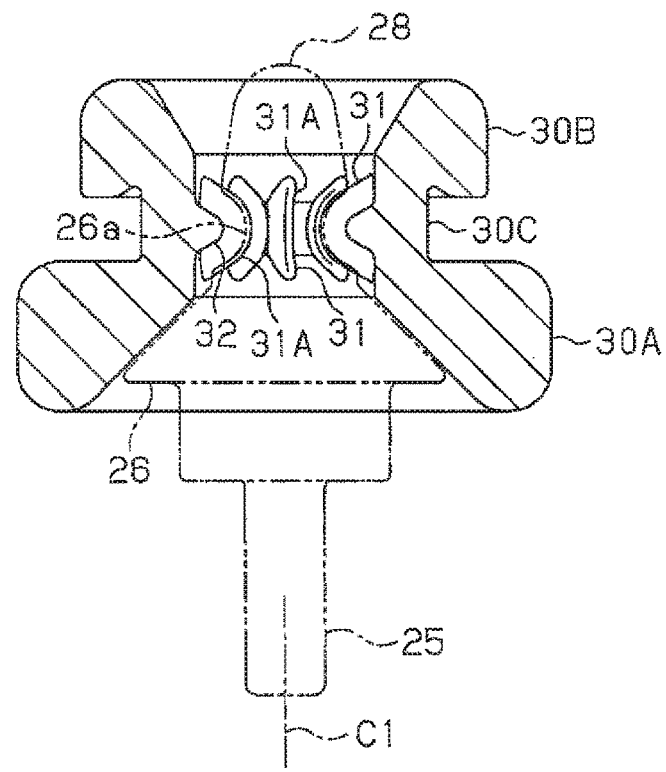
FIG. 5 is a cross-sectional view illustrating a cross-sectional structure of the damping member included in the fastening-member driving mechanism according to the embodiment, the cross-sectional structure being taken along line 5-5 in FIG. 2.

As indicated by the two-dot chain line in FIG. 5, on a cross-sectional plane including the central axis C1 of the abutting section 26, the abutting surface 26a of the abutting section 26 is in the shape of a semi-circular arc, while the two ends of the semi-circular arc are substantially aligned along the central axis C1. Further, as indicated by the solid line in FIG. 5, on a cross-sectional plane including the central axis C1 of the abutting section 26, each of the lip distal-end sections 31B of the elastic lips 31 is also in the shape of a semi-circular arc, while the two ends of the semi-circular arc are also aligned along the central axis C1. As viewed on a cross-sectional plane that includes the central axis C1 of the abutting section 26, the outline of each of the lip distal-end sections 31B is substantially analogous to the shape of the abutting surface 26a. The curvature of each of the lip distal-end sections 31B is slightly larger than the curvature of the abutting surface 26a. While the abutting surface 26a is positioned on the inside of the small diameter cylinder section 30C, substantially the entirety of each of the lip distal-end sections 31B having the semi-circular arc shape abuts against the abutting surface 26a. Thus, any change in the position of the small diameter cylinder section 30C with respect to the abutting section 26 is transformed into an elastic deformation of one or more of the elastic lips 31, regardless of whether the change is a change along the radial direction of the small diameter cylinder section 30C or the change is a change along the axial direction of the small diameter cylinder section 30C.

<Operations of Fastening-Member Driving Mechanism>

Operations of the fastening-member driving mechanism will be explained while a focus is placed on operations of the elastic lips 31, with reference to FIGS. 6 to 8.

Figure 6:
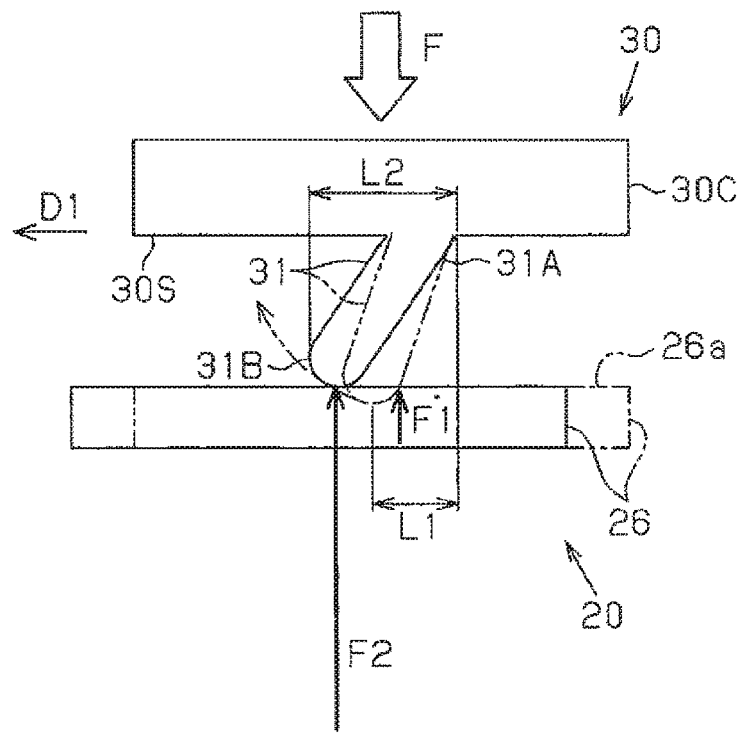
FIG. 6 is a conceptual drawing illustrating a function of elastic lips included in the fastening-member driving mechanism according to the embodiment and illustrating a relationship between stress and an urging force acting on an elastic lip.

As illustrated in FIG. 6, when the small diameter cylinder section 30C receives stress F along the direction in which the small diameter cylinder section 30C approaches the abutting section 26, the elastic lip 31 makes a transition from the state indicated by the two-dot chain line in FIG. 6 into the state indicated by the solid line in FIG. 6. In other words, the lip distal-end section 31B of the elastic lip 31 moves along the locus of the arc indicated by the two-dot chain line in FIG. 6 so as to approach an inner circumferential surface 30S of the small diameter cylinder section 30C, and the elastic lip 31 therefore falls down.

In that situation, before the stress F (see the bold white arrow) acts on the small diameter cylinder section 30C, the distance between the lip basal-end section 31A and the lip distal-end section 31B in the forward direction D1 is a release distance L1, while the resistance pressing the abutting surface 26a against the lip distal-end section 31B is a release resistance F1 working as a vertical resistance. In contrast, when the stress F is acting on the small diameter cylinder section 30C, the distance between the inner circumferential surface 30S of the small diameter cylinder section 30C and the abutting surface 26a becomes shorter, so that the distance between the lip basal-end section 31A and the lip distal-end section 31B in the forward direction D1 becomes longer so as to be an accumulation distance L2, and also, the resistance pressing the abutting surface 26a against the lip distal-end section 31B becomes larger so as to be an accumulation resistance F2 working as a vertical resistance.

As a result, the friction force acting between the lip distal-end section 31B and the abutting surface 26a becomes larger. Due to the increase in the friction force, the abutting surface 26a is displaced in the forward direction D1, together with the lip distal-end section 31B. In other words, an urging force that urges the lip basal-end section 31A to displace the abutting surface 26a in the forward direction D1 is accumulated in the elastic lip 31 so as to act on the abutting section 26.

Figure 7:
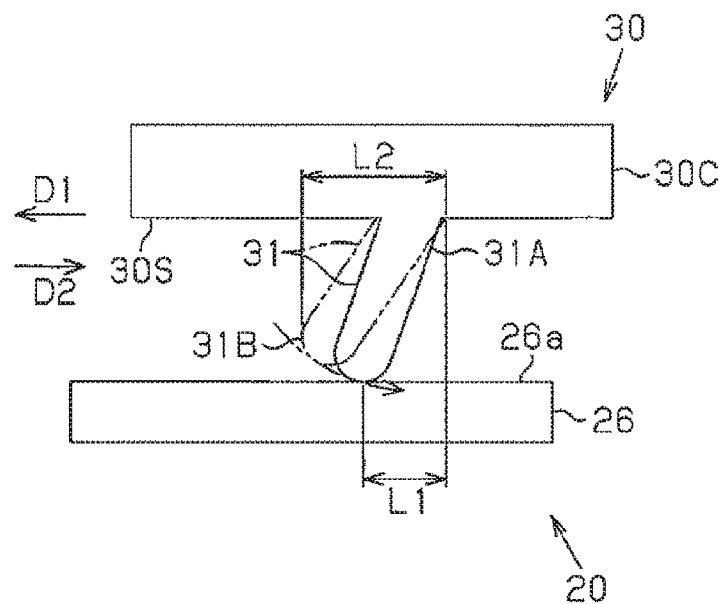
FIG. 7 is a conceptual drawing illustrating the function of the elastic lips included in the fastening-member driving mechanism according to the embodiment and illustrating the relationship between the stress and the urging force acting on the elastic lip.

As illustrated in FIG. 7, when the stress F that caused the small diameter cylinder section 30C to approach the abutting section 26 is released, the elastic lip 31 makes a transition from the state indicated by the two-dot chain line in FIG. 7 into the state indicated by the solid line in FIG. 7. In other words, the lip distal-end section 31B of the elastic lip 31 moves along the locus of the arc indicated by the two-dot chain line in FIG. 7 so as to move away from the inner circumferential surface 30S of the small diameter cylinder section 30C, and the elastic lip 31 therefore rises up.

In that situation, as a result of the stress F being released, the distance between the inner circumferential surface 30S of the small diameter cylinder section 30C and the abutting surface 26a becomes longer, and the distance between the lip basal-end section 31A and the lip distal-end section 31B in the forward direction D1 returns from the accumulation distance L2 to the release distance L1. Further, the resistance pressing the abutting surface 26a against the lip distal-end section 31B also decreases from the accumulation resistance F2 to the release resistance F1.

As a result, the friction force acting between the lip distal-end section 31B and the abutting surface 26a becomes smaller. Due to the decrease in the friction force, the displacement of the abutting surface 26a in a reverse direction D2 together with the lip distal-end section 31B is inhibited. In other words, the urging force that urges the lip basal-end section 31A to displace the abutting surface 26a in the forward direction D1 is released at the elastic lip 31, so that the abutting surface 26a maintains being displaced along the forward direction D1, with respect to the lip basal-end section 31A serving as a fixed end.

Figure 8:
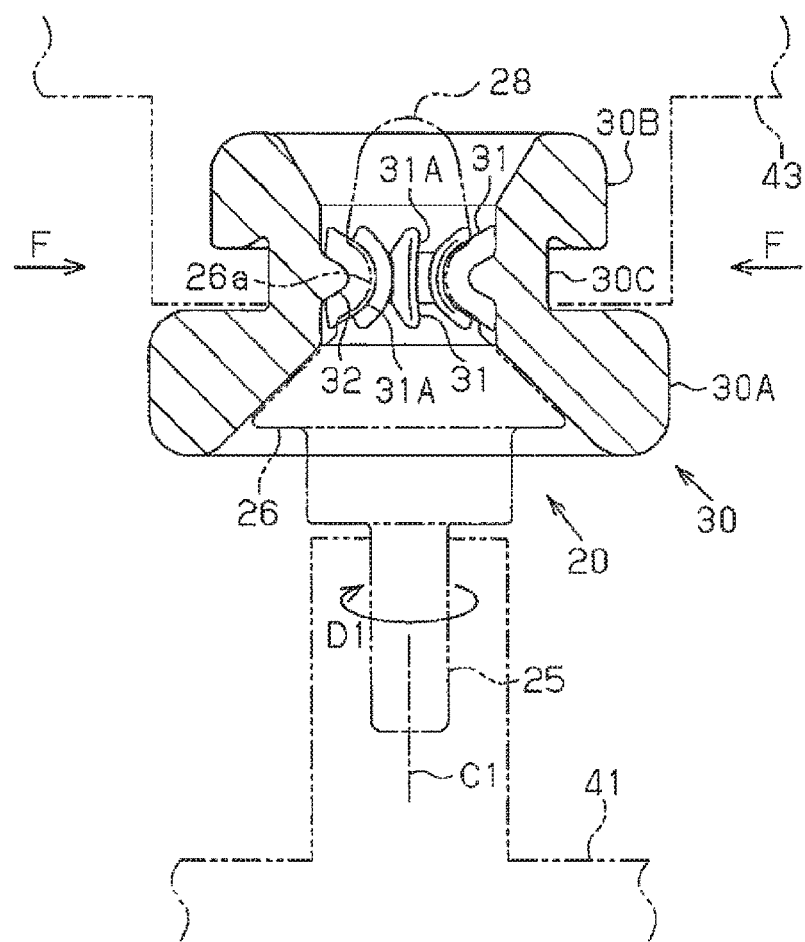
FIG. 8 is an action diagram illustrating an action of the fastening-member driving mechanism according to the embodiment and illustrating a relationship between vibration acting on the elastic lips and rotation of the fastening member.

As illustrated in FIG. 8, part of the vibration occurring in the cylinder head 41 is transmitted, to no small extent, also to the cylinder head cover 43 via the fastening screw 20 and the damping member 30. In that situation, the vibration of the cylinder head cover 43 and the vibration of the cylinder head 41 are different from each other in the directions of the vibrations and the cycles of the vibrations. In addition, because substantially the entirety of the lip distal-end sections 31B each having the semi-circular arc shape abuts against the abutting surface 26a, the vibration acts as an acting force that presses the lip distal-end sections 31B of the elastic lips 31 against the abutting surface 26a, regardless of whether the vibration of the small diameter cylinder section 30C with respect to the abutting section 26 is in the direction along the radial direction of the small diameter cylinder section 30C or the vibration is in the direction along the axial direction of the small diameter cylinder section 30C.

As a result, in each of the plurality of elastic lips 31, the application and the release of the stress F are repeated with timing that is different therebetween, the stress F pressing the lip distal-end section 31B of the elastic lip 31 against the abutting surface 26a. Further, every time the application and the release of the stress F are repeated in each of the plurality of elastic lips 31, the fastening screw 20 is displaced along the forward direction D1 with respect to the damping member 30, i.e., the cylinder head cover. Accordingly, the fastening screw 20 either rotates along the direction in which the fastening screw 20 is fastened onto the cylinder head 41 or receives a rotating force in the same direction. Consequently, even if the screw-thread engagement between the fastening screw 20 and the cylinder head 41 is loosened, it is possible to re-tighten the screw-thread engagement. In addition, when the screw-thread engagement between the fastening screw 20 and the cylinder head 41 has not yet become loose, it is also possible to inhibit the screw-thread engagement between the fastening screw 20 and the cylinder head 41 from starting to become loose.

According to the embodiment described above, it is possible to achieve advantageous effects listed below:

(1) When the cylinder head cover 43 vibrates relative to the cylinder head 41, the elastic lips 31 vibrate relative to the abutting surface 26a, so that the accumulation and the release of the urging force are repeated in the elastic lips 31. Further, the position of the fastening screw 20 relative to the position of the damping member 30 changes along the direction in which the fastening screw 20 is fastened onto the cylinder head 41 every time the urging force is accumulated. As a result, it is possible to inhibit the fastening of the fastening screw 20 from becoming loose.

(2) Each of the plurality of lip distal-end sections 31B individually abuts against the abutting surface 26a entirely along the circumferential direction of the abutting surface 26a, while the direction in which each of the elastic lips 31 extends and the direction of the tangent line of the abutting surface 26a forms an acute angle. In addition, the urging force released by the elastic lips 31 is received by the abutting surface 26a. Consequently, the displacement of the abutting surface 26a along the forward direction D1 is smoothly developed when the urging force is accumulated.

(3) The cylinder section of the small diameter cylinder section 30C has the function of maintaining the abutment between the elastic lips 31 and the abutting surface 26a. The cylinder section of the small diameter cylinder section 30C and the elastic lips 31 are integrally formed. Consequently, it is easier to maintain the abutment between the elastic lips 31 and the abutting surface 26a, compared to the situation where the plurality of elastic lips 31 and the state maintaining section that maintains the abutment thereof are structured as separate members.

(4) It is possible to realize the structure that inhibits the fastening of the fastening screw 20 from becoming loose by using the simple shapes of the fastening screw 20 that has a shaft-like shape and the damping member 30 that is in the shape of a cylinder positioned on the outer circumference of the fastening screw 20.

(5) Because each of the plurality of lip distal-end sections 31B applies the urging force to the abutting surface 26a, the urging force applied from the damping member 30 to the fastening screw 20 is enhanced by as much as the quantity of the elastic lips 31, compared to the situation where only a single elastic lip 31 applies an urging force to the abutting surface 26a. Consequently, it is possible to inhibit the fastening of the fastening screw 20 from becoming loose, with higher certainty.

(6) The cylinder head 41 and the fastening screw 20 engage with each other via the screw thread, as a result of the fastening screw 20 being inserted into the attachment hole 42. Consequently, it is possible to save the labor required by achieving the screw-thread engagement, compared to the situation where the screw-thread engagement therebetween is achieved by rotating the fastening screw 20.

The embodiment described above may be modified as described below.

Figure 9:
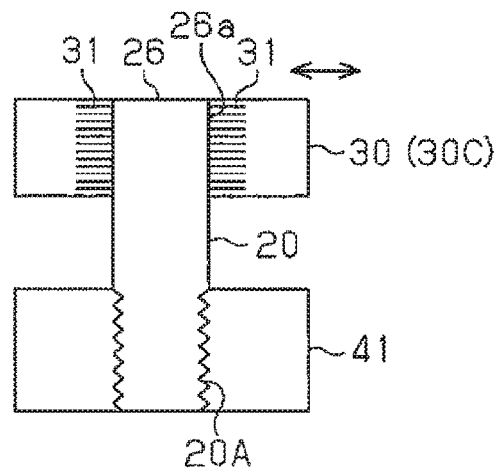
FIG. 9 is a configuration diagram that conceptually illustrates elements included in the fastening-member driving mechanism according to the embodiment and connections among the elements.

As illustrated in FIG. 9, in the embodiment described above, the fastening screw 20 is described as an example of the first component part and the fastening member, while the damping member 30 is described as an example of the second component part and the coupled member. Further, the abutting surface 26a, the elastic lips 31, and the small diameter cylinder section 30C are described as examples of the abutting section, the urging section, and the state maintaining section, respectively. Also, the cylinder head 41 is described as an example of the coupled target, whereas the fitting screw section 20A is described as an example of the screw-thread engaging section. These elements may be modified as described below.

First Modification Example: Urging Section and Abutting Section

Figure 10:
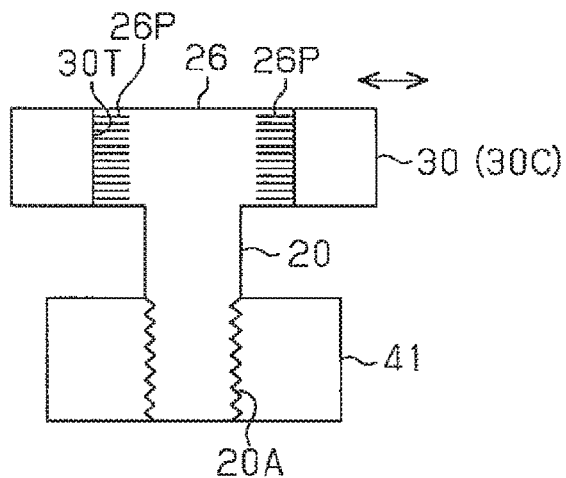
FIG. 10 is a configuration diagram illustrating a configuration of a component-part driving mechanism according to a first modification example.

As illustrated in FIG. 10, the elastic lips 31 are omitted from the damping member 30. The outer circumferential surface of the abutting section 26 of the fastening screw 20 has elastic lips 26P serving as an example of the urging section. The inner circumferential surface of the damping member 30 has an abutting surface 30T serving as an example of the abutting section. The cylinder section of the small diameter cylinder section 30C functions as a state maintaining section that maintains the abutment between the elastic lips 26P and the abutting surface 30T.

In this configuration also, the position of the fastening screw 20 relative to the position of the damping member 30 changes along the direction in which the fastening screw 20 is fastened onto the cylinder head 41, every time the urging force is accumulated. As a result, it is possible to inhibit the fastening of the fastening screw 20 from becoming loose.

It is also acceptable to structure a single component-part driving mechanism by combining the abutment structure between the urging section and the abutting section described in the embodiment above, with the abutment structure between the urging section and the abutting section described in the first modification example.

In other words, it is sufficient when the urging section is provided for one of the fastening member and the coupled member, while the abutting section is provided for the other of the fastening and the coupled members that is different from the member with which the urging section is provided.

Second Modification Example: State Maintaining Section

Figure 11:
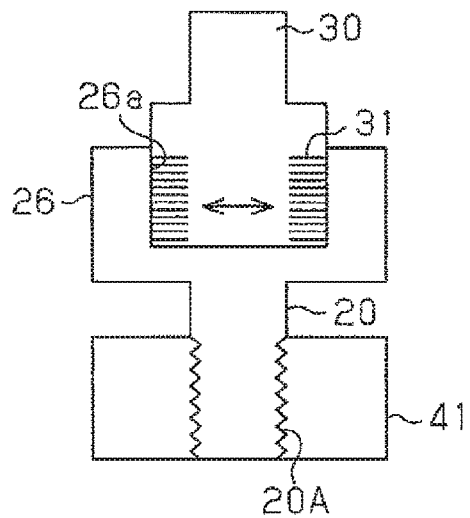
FIG. 11 is a configuration diagram illustrating a configuration of a component-part driving mechanism according to a second modification example.

As illustrated in FIG. 11, the abutting section 26 of the fastening screw 20 is provided with a recess having an opening toward the damping member 30. The inner surface of the recess functions as the abutting surface 26a serving as an example of the abutting section. The damping member 30 has the plurality of elastic lips 31 that protrude toward the abutting surface 26a and that serve as an example of the urging section. Each of the plurality of elastic lips 31 abuts against the abutting surface 26a. The circumferential wall of the abutting section 26 functions as a state maintaining section that maintains the abutment between the elastic lips 31 and the abutting surface 26a.

In this configuration also, the position of the fastening screw 20 relative to the position of the damping member 30 changes along the direction in which the fastening screw 20 is fastened onto the cylinder head 41, every time the urging force is accumulated. As a result, it is possible to inhibit the fastening of the fastening screw 20 from becoming loose. Further, because the urging section and the state maintaining section are provided for the mutually-different members, the member provided with the urging section is able to have a structure or to use a material that specializes in the accumulation and the release of the urging force which the urging section is required to realize. Further, the member provided with the engagement section is able to have a structure or to use a material that specializes in maintaining the abutment state between the urging section and the abutting section.

In this configuration also, it is acceptable to structure a single component-part driving mechanism by combining the abutment structure between the urging section and the abutting section described in at least one of the embodiment above and the first modification example, with the abutment structure between the urging section and the abutting section described in the second modification example.

In other words, the state maintaining section may be provided for the fastening member or may be provided for the coupled member. The state maintaining member may be provided for at least one of the first component part and the second component part. Alternatively, the state maintaining member may be structured as another member that is different from the first component part or the second component part.

Figure 12:
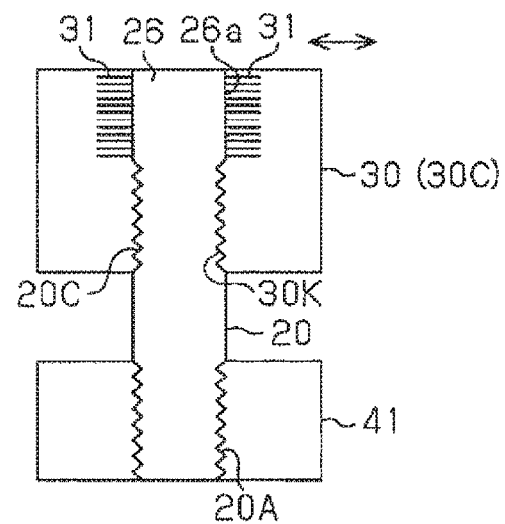
FIG. 12 is a configuration diagram illustrating a configuration of a component-part driving mechanism according to a third modification example.

Third Modification Example: Screw-Thread Engaging Section and Screw-Thread Engaged Section As illustrated in FIG. 12, the fastening screw 20 includes, on the outer circumferential surface of the abutting section 26, a screw-thread engaging section 20C that is either a male screw section or a female screw section that engages, via a screw thread, with the damping member 30. The inner circumferential surface of the damping member 30 is provided with a screw-thread engaged section 30K capable of engaging, via the screw thread, with the screw-thread engaging section 20C as a result of the fastening screw 20 rotating in the forward direction D1.

In this configuration also, the position of the fastening screw 20 relative to the position of the damping member 30 changes along the direction in which the fastening screw 20 is fastened onto the cylinder head 41 every time the urging force is accumulated. Further, the position of the fastening screw 20 relative to the position of the damping member 30 changes along the direction in which the fastening screw 20 is fastened onto the damping member 30, every time the urging force is accumulated.

As a result, it is possible to inhibit the fastening of the fastening screw 20 onto the cylinder head 41 from becoming loose. In addition, even in the situation where the fastening of the fastening screw 20 onto the damping member 30 becomes loose, it is possible to tighten the fastening.

In this configuration also, it is acceptable to structure a single component-part driving mechanism by combining the abutment structure between the urging section and the abutting section described in at least one selected from the group consisting of the embodiment above, the first modification example, and the second modification example, with the abutment structure between the urging section and the abutting section described in the third modification example.

In other words, the screw-thread engaging section is provided for the fastening member, whereas the screw-thread engaged section that engages with the screw-thread engaging section may be provided for the coupling target or the coupled member.

Fourth Modification Example: Coupling Target

Figure 13:
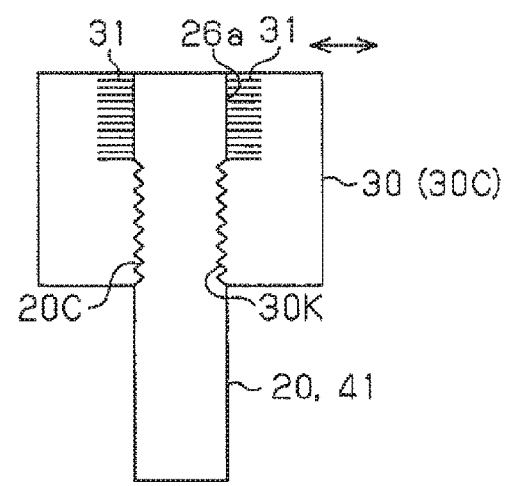
FIG. 13 is a configuration diagram illustrating a configuration of a component-part driving mechanism according to a fourth modification example.

As illustrated in FIG. 13, the fastening screw 20 includes, on the outer circumferential surface of the abutting section 26, the screw-thread engaging section 20C that is either a male screw section or a female screw section that engages, via a screw thread, with the damping member 30. The inner circumferential surface of the damping member 30 is provided with a screw-thread engaged section 30K capable of engaging, via the screw thread, with the screw-thread engaging section 20C as a result of the fastening screw 20 rotating in the forward direction D1. Further, the female screw section of the cylinder head 41 and the fitting screw section 20A of the fastening screw 20 are omitted, while the cylinder head 41 and the fastening screw 20 are integrally formed.

In this configuration, the fastening screw 20 and the cylinder head 41 are examples of the first component part having the abutting section, whereas the damping member 30 is an example of the second component part having the urging section. Further, because the fastening target of the fastening screw 20 is the damping member 30, it is possible to inhibit the fastening of the fastening screw 20 onto the damping member 30 from becoming loose.

Figure 14:
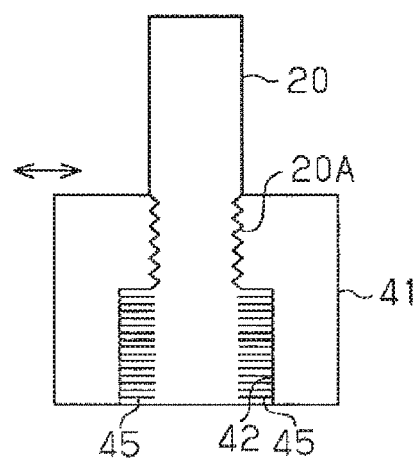
FIG. 14 is a configuration diagram illustrating another configuration of the component-part driving mechanism according to the fourth modification example.

As illustrated in FIG. 14, the fastening screw 20 includes a fitting screw section 20A that is either a male screw section or a female screw section that engages, via a screw thread, with the cylinder head 41. The fastening screw 20 further includes elastic lips 45 to be housed on the inside of the attachment hole 42 formed in the cylinder head 41. The inner circumferential surface of the attachment hole 42 functions as an abutting surface that abuts against the elastic lips 45. Further, the damping member 30 is omitted.

In this configuration, the cylinder head 41 is an example of the first component part having the abutting section, whereas the fastening screw 20 is an example of the second component part having the urging section. Further, because the fastening target of the fastening screw 20 is the cylinder head 41, it is possible to inhibit the fastening of the fastening screw 20 onto the cylinder head 41 from becoming loose.

In this configuration also, it is acceptable to structure a single component-part driving mechanism by combining the abutment structure between the urging section and the abutting section described in at least one selected from the group consisting of the embodiment above, the first modification example, the second modification example, and the third modification example, with the abutment structure between the urging section and the abutting section described in the fourth modification example.

Fifth Modification Example: Stopping Member

When strong vibration keeps occurring in the cylinder head 41 described above, the application and the release of the stress F are repeated with a large magnitude that causes the elastic lips 31 to fall down excessively and thus shortens the life of the elastic lips 31. To cope with this situation, for the purpose of extending the life of the elastic lips 31, a component-part driving member may be configured so that the outer circumferential surface of the fastening screw 20 is provided with a stopped member, while the inner circumferential surface of the damping member 30 is provided with a stopping member and so that, when the movement of the fastening screw 20 relative to the damping member 30 is developed excessively, the stopping member abuts against the stopped member so as to inhibit the relative movement with the abutment.

Figure 15:
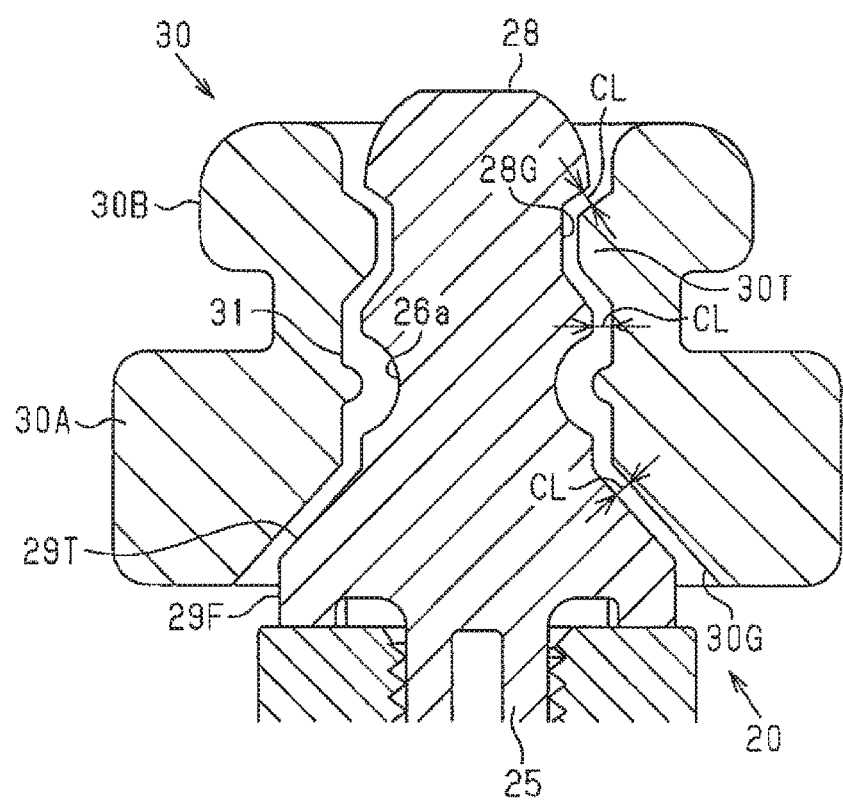
FIG. 15 is a configuration diagram illustrating another configuration of a component-part driving mechanism according to a fifth modification example.

For example, as illustrated in FIG. 15, the outer circumferential surface of the fastening screw 20 is provided with a basal-end receiving section 29F that serves as an example of a first stopped member and a distal-end receiving section 28G that serves as an example of a second stopped member. The basal-end receiving section 29F and the distal-end receiving section 28G sandwich the elastic lips 31 in the axial direction of the fastening screw 20. The basal-end receiving section 29F is in the shape of a frustum which has a sloped face 29T and of which the diameter is gradually reduced from the basal end of the fastening screw 20 toward the distal end thereof. The distal-end receiving section 28G is a recess receding toward the inner side in the radial direction of the fastening screw 20 and is formed along the entire circumference of the fastening screw 20.

Further, the inner circumferential surface of the damping member 30 is provided with an abutting opening 30G that serves as an example of a first stopping member positioned opposite to the basal-end receiving section 29F and is also provided with an abutting claw 30T that serves as an example of a second stopping member positioned opposite to the distal-end receiving section 28. The abutting opening 30G is in the shape of the cylindrical surface of a frustum which has a sloped face and of which the diameter is gradually enlarged from the distal end of the fastening screw 20 toward the basal end thereof. The abutting claw 30T is a projection protruding toward the inner side in the radial direction of the damping member 30 and is formed along the entire circumference of the damping member 30.

A predetermined clearance CL is provided between the abutting opening 30G and the basal-end receiving section 29F. Further, a predetermined clearance CL is also provided between the abutting claw 30T and the distal-end receiving section 28G. The dimension of the clearance CL is arranged to be smaller than the maximum value tolerated by the elastic lips 31 among variable values of the distance between the lip distal-end sections 31B and the lip supporting section 32. Further, the dimension of the clearance CL is arranged to be larger than a value sufficient for inhibiting the screw-thread engagement between the fastening screw 20 and the cylinder head 41 from becoming loose, among variable values of the distance between the lip distal-end sections 31B and the lip supporting section 32.

With the structure described above, even when the fastening screw 20 moves upward excessively, for example, it is possible to suppress the upward movement of the fastening screw 20 within a range where the excessive fall-down of the elastic lips 31 can be avoided, due to the abutment between the abutting opening 30G and the basal-end receiving section 29F and the abutment between the abutting claw 30T and the distal-end receiving section 28G. Further, for example, even when the fastening screw 20 moves downward excessively, it is possible to suppress the downward movement of the fastening screw 20 within a range where the excessive fall-down of the elastic lips 31 can be avoided, due to the abutment between the abutting claw 30T and the distal-end receiving section 28G. Further, even when the fastening screw 20 moves in the left-and-right directions excessively, it is possible to suppress the movement of the fastening screw 20 within a range where the excessive fall-down of the elastic lips 31 can be avoided, due to the abutment between the abutting opening 30G and the basal-end receiving section 29F and the abutment between the abutting claw 30T and the distal-end receiving section 28G. Consequently, it is possible to extend the life of the elastic lips 31.

Alternatively, another arrangement is acceptable in which both the first stopped member and the second stopped member are recesses receding toward the inner side in the radial direction of the fastening screw 20, whereas both the first stopping member and the second stopping member are projections protruding toward the inner side in the radial direction of the damping member 30. Conversely, yet another arrangement is also acceptable in which both the first stopped member and the second stopped member are projections protruding toward the outer side in the radial direction of the fastening screw 20, whereas both the first stopping member and the second stopping member are recesses receding toward the outer side in the radial direction of the damping member 30. Further, the first stopped member and the first stopping member may be omitted from the configuration described above. Alternatively, the second stopped member and the second stopping member may be omitted.

Furthermore, in this configuration also, it is acceptable to structure a single component-part driving mechanism by combining the abutment structure between the urging section and the abutting section described in at least one selected from the group consisting of the embodiment above, the first modification example, the second modification example, the third modification example, and the fourth modification example, with the abutment structure between the urging section and the abutting section described in the fifth modification example.

Other Modification Examples

The shape of each of the elastic lips 31 is not limited to the shape of the cylindrical surface of a conical frustum and may be, for example, a plate-like shape extending from the inner circumferential surface of the small diameter cylinder section 30C toward the inner side in the radial direction thereof. In that situation, it is sufficient if, when the stress F is applied to the elastic lips, the lip distal-end sections 31B move in the forward direction D1 with respect to the lip basal-end sections 31A.

In other words, it is sufficient if the urging section is shaped so that the accumulation of the urging force and the release of the urging force can be repeated due to the vibration of the urging section relative to the abutting section. The shape of the urging section may be modified, as appropriate, in accordance with the shape of the abutting section against which the urging section abuts.

The quantity of the elastic lips 31 may be one or more.

For example, the positions of the plurality of elastic lips 31 may be mutually the same in the axial direction of the small diameter cylinder section 30C or may be different from one another in the axial direction of the small diameter cylinder section 30C. The distance between any two elastic lips 31 positioned adjacent to each other may be regular in the circumferential direction of the small diameter cylinder section 30C or may be irregular among the pairs of elastic lips 31 positioned adjacent to each other.

The surface of each of the elastic lips 31 may be a smooth surface having no unevenness or may be an uneven surface obtained by applying a knurling process or a blasting process thereto. Further, the abutting surface 26a of the abutting section 26 may be a smooth surface having no unevenness or may be an uneven surface obtained by applying a knurling process or a blasting process thereto.

In other words, it is sufficient if the surface of the abutting section and the surface of the urging section have such a surface structure where the accumulation of the urging force and the release of the urging force are repeated due to the vibration of the urging section relative to the abutting section, so that the positions thereof relative to each other are displaced in a predetermined direction due to the friction.

For example, the abutting surface 26a of the abutting section 26 may have, along the circumferential direction of the small diameter cylinder section 30C, a latch structure configured with a plurality of engagement sections capable of engaging with the elastic lips 31. In other words, it is acceptable to arrange the abutment structure between the abutting section and the urging section to be such a structure where the accumulation of the urging force and the release of the urging force are repeated due to the vibration of the urging section relative to the abutting section, so that the positions thereof relative to each other are displaced in a predetermined direction due to the engagement and the disengagement therebetween.

The urging section included in the second component part does not necessarily have to be embodied as the elastic lips. The urging section may be structured so that the urging section itself exerts an elastic deformation by using, for example, fimbria, nylon brush, a plate spring made of resin, an elastically deformable metal plate, an elastic member having a bellow-like shape, or the like. Alternatively, the urging section may be structured so as to exert a mechanical deformation by using, for example, a link mechanism urged by a coil spring. In other words, it is sufficient if the urging section has a structure where the accumulation of the urging force and the release of the urging force are repeated due to the vibration of the urging section relative to the abutting section.

The vibration of the urging section relative to the abutting section may be vibration caused by an engine installed in a vehicle, a watercraft, an airplane, or the like, or may be vibration caused by, for example, a motor installed in a vehicle, an air conditioner, a washing machine, a refrigerator, or the like, or pulsating motion caused by a pipe through which fluid flows.

The component part driven by the component-part driving mechanism is not limited to a fastening screw attached to a cylinder head and may be, for example, a fastening member used for any of various types of interior decorations of a vehicle, a cap attached as a molding end cap, or a fastening member used in a driving mechanism for a louver of an air conditioner. Further, in architectural structures, the component part driven by the component-part driving mechanism may be, for example, an anchor bolt used for a tunnel, a bolt used for a beam of a bridge, or the like. Further, in housing facilities and clothing items, the component part driven by the component-part driving mechanism may be, for example, a banner turning-and-rising inhibiting member that inhibits a banner from turning and rising, a fastening member used for attaching a cover of a ventilation fan to a wall surface, a cord locking mechanism used for preventing a shoelace from becoming loose, or the like. Further, the component part driven by the component-part driving mechanism may be a fastening member used for any of various temporary fixing purposes. In other words, the component part may be any member that can be displaced by vibration in an undesirable direction.

The description, the claims, the drawings, and the abstract of Japanese Patent Application No. 2013-261137 filed on Dec. 18, 2013 are herein incorporated by reference in their entirety as a disclosure of the description of the present invention.

The invention claimed is:

1. A component-part driving mechanism that changes a relative position of a second component part relative to a position of a first component part, comprising:
   a fastening member having a shaft and an abutting section provided for the first component part; and
   a three-tiered coupled member where one tier has a smaller diameter that serves as a state maintaining section, the coupled member including an urging section provided for the second component part, wherein
   the urging section comprises a plurality of elastic lips which accumulate an urging force as a result of changes in a distance between the abutting section and the urging section, said urging force serving to change the relative position in one predetermined circumferential direction, wherein
   the state maintaining section maintains a state in which the urging section is abutting against the abutting section, wherein
   the abutting section and the urging section displace the relative position in the predetermined circumferential direction as a result of a repetition of accumulating and releasing of the urging force due to vibration of the urging section relative to the abutting section.

2. The component-part driving mechanism according to claim 1, wherein
   the abutting section is configured to receive the urging force in a direction in which the urging force acts.

3. The component-part driving mechanism according to claim 1, wherein
   one of the first and the second component parts is a fastening member that rotates in the predetermined circumferential direction in which the fastening member fastens onto a coupling target,
   the other of the first and the second component parts that is not the fastening member is a coupled member that is fastened onto the coupling target via the fastening member,
   one of the coupling target and the coupled member includes a screw-thread engaged section that is either a female screw section or a male screw section, and
   the fastening member includes a screw-thread engaging section that engages with the screw-thread engaged section.

4. The component-part driving mechanism according to claim 3, wherein
   the urging section is provided for one of the fastening member and the coupled member, and
   the state maintaining section is provided for another one of the fastening and the coupled members that is not provided with the urging section.

5. The component-part driving mechanism according to claim 4, wherein
   the coupled member is in a shape of a cylinder positioned on an outer circumference of the fastening member.

6. The component-part driving mechanism according to claim 3, wherein
   the fastening member has an outer circumference enlarged section that is positioned adjacent to the abutting section.

7. The component-part driving mechanism according to claim 3, comprising a plurality of the urging sections, wherein the plurality of elastic lips are arranged at regular intervals along an inner circumferential surface of the state maintaining section and in the direction in which the fastening member rotates.

8. The component-part driving mechanism according to claim 3, wherein
the screw-thread engaging section has an elastic force that enables the screw-thread engaging section to go over a screw section of the screw-thread engaged section.

9. The component-part driving mechanism according to claim 1, wherein
the plurality of elastic lips are arranged at regular intervals along an inner circumferential surface of the state maintain section and in the direction in which the fastening member rotates.

10. The component-part driving mechanism according to claim 1, wherein the abutting section is in the shape of a cone.

11. The component-part driving mechanism according to claim 1, wherein an abutting surface of the abutting section is in the shape of a semi-circular arc.

* * * * *